Patented Apr. 29, 1952

2,594,489

UNITED STATES PATENT OFFICE 2,594,489

PROCESS FOR THE PREPARATION OF SATURATED OXONITRILES

Tracy M. Patrick, Jr., Dayton, Ohio, assignor to Monsanto Chemical Company, St. Louis, Mo., a corporation of Delaware No Drawing. Application October 26, 1950, Serial No. 192,355

10 Claims. (Cl. 260—465.1)

This invention relates to a novel process for the preparation of saturated oxonitriles comprising the reaction of saturated aldehydes with crotononitrile in the presence of a free radical promoting catalyst.

The saturated oxonitriles which can be prepared by this process can be diagrammatically shown by the structural formula

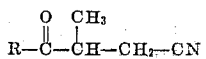

wherein R is a saturated organic radical selected from the group consisting of alkyl, cycloalkyl and oxacycloalkyl radicals containing up to 17 carbon atoms.

The saturated 2 to 18 carbon atom aldehydes can be selected from the group consisting of aliphatic, alicyclic and oxaheterocyclic aldehydes, as for example, ethanal, propanal, butanal, pentanal, hexanal, heptanal, octanal, nonanal, decanal, dodecanal, tetradecanal, hexadecanal, octadecanal, 2-ethylhexanal, hexahydrobenzaldehyde, tetrahydrofurfural and the like. The 2 to 8 carbon atom aliphatic aldehydes are preferred.

The free radical promoting catalysts are, for example, acetyl peroxide, benzoyl peroxide, lauroyl peroxide, stearoyl peroxide, hydrogen peroxide, peracetic acid, sodium perborate, potassium persulfate and the like. The free radical promoting catalyst is generally employed at from about 0.1 to about 5 mole per cent and preferably from about 0.25 to about 2 mole per cent based on the weight of the total reactants; and the catalyst may be added all at once, in increments or continuously over a period of time.

The temperature at which the reaction is maintained is not critical. The temperature may range from —50° C. to the decomposition point of the reactants but the range of from about 25° C. to about 100° C. is preferred. In general the temperature should be selected such that the free radical promoting catalyst is decomposed at a moderate rate during the course of the reaction, for example, if benzoyl peroxide is the free radical promoting catalyst a temperature in the range of from about 70° C. to about 90° C. is preferred.

The following example is illustrative of the invention:

A mixture of 216 g. (3.0 moles) of redistilled n-butanal and 67.0 g. (1.0 mole) of crotononitrile was heated to reflux (82° C.) in a reaction vessel equipped with a reflux condenser and 2.0 g. of benzoyl peroxide added thereto. Refluxing was continued for a total of about 127 hours with periodic additions of benzoyl peroxide as shown below:

| Time interval (hrs.) | Weight Bz₂O₂ added (g.) | Reflux Temp. (° C.) |
|---|---|---|
| 0 | 2.0 | 82 |
| 7 | 2.0 | 82.5 |
| 23 | 1.0 | 83.3 |
| 31 | 2.0 | 84.0 |
| 48 | 1.0 | 85.7 |
| 55 | 2.0 | 86.3 |
| 71 | 1.0 | 87.6 |
| 79 | 2.0 | 88.0 |
| 106 | 2.0 | 88.8 |
| 127 | Shut down | 89.2 |

The dark amber reaction mixture was then fractionated through a Vigreux distilling column and the excess reactants recovered. A yield of 79 per cent of the reaction product was obtained. This product was diluted with an equal volume of benzene and extracted with a saturated solution of sodium bicarbonate to remove the last traces of benzoic acid, then the mixture was washed three times with water, dried by adding anhydrous sodium sulfate thereto, the sodium sulfate removed by filtration, and finally the benzene stripped off to reobtain the reaction product. The reaction product was then fractionated through a Lecky column and a small amount of the first-overs discarded. Substantially all of the product boiled at from 98.0 to 98.3° C. at 5 mm. of mercury pressure, had a refractive index of 1.4343 at 25° C., density $$\left(\frac{25}{25}\right)$$

of 0.9337 and was a colorless liquid. The compound was identified as 3-methyl-4-oxoenanthonitrile.

Calculated for C₈H₁₃ON: C, 69.05%; H, 9.41%
Found: C, 69.21%; H, 9.13%

The hydrazone of 3-methyl-4-oxoenanthonitrile was prepared and found to have a melting point of 121 to 122° C. The nitrogen content of the hydrazone is calculated to be 27.42%; analysis of the hydrazone gave 27.57% N.

The addition to the one to one adduct, 3-methyl-4-oxoenanthonitrile, a yield of about 20 per cent of a dark brown liquid telomeric composition was obtained, based on the one to one adduct.

Other compounds which can be prepared by the novel free radical induced reaction described herein are, for example:

3-methyl-4-oxovaleronitrile
3-methyl-4-oxocapronitrile
3-methyl-4-oxocaprylonitrile
3-methyl-4-oxopelargononitrile
3-methyl-4-oxocaprinitrile
3-methyl-4-oxoundecanenitrile
3-methyl-4-oxopentadecanenitrile
3-methyl-4-oxomargaronitrile
3-methyl-4-oxononadecanenitrile
3-methyl-4-oxoheneicosanenitrile
3-methyl-5-ethyl-4-oxopelargononitrile
3-methyl-4-cyclohexyl-4-oxobutyronitrile
3-methyl-4-tetrahydrofuryl-4-oxobutyronitrile

I claim:

1. The process comprising the reaction of (A) a molar excess of a saturated aldehyde containing from 2 to 18 carbon atoms, inclusive, having the formula RCHO, wherein R is a saturated hydrocarbon radical containing from 1 to 17 carbon atoms, inclusive, with (B) crotononitrile, in the presence of (C) a free radical promoting catalyst.

2. The process comprising the reaction of (A) a molar excess of an aliphatic saturated aldehyde containing from 2 to 8 carbon atoms, inclusive, with (B) crotononitrile, in the presence of (C) a free radical promoting catalyst.

3. The process of claim 2 wherein (A) is butanal and (C) is benzoyl peroxide.

4. The process of claim 2 wherein (A) is ethanal and (C) is benzoyl peroxide.

5. The process of claim 2 wherein (A) is propanal and (C) is benzoyl peroxide.

6. The process of claim 2 wherein (A) is heptanal and (C) is benzoyl peroxide.

7. The process of claim 2 wherein (A) is 2-ethylhexanal and (C) is benzoyl peroxide.

8. The process comprising the reaction of (A) a molar excess of a saturated aldehyde containing from 2 to 8 carbon atoms, inclusive, having the formula RCHO, wherein R is a saturated hydrocarbon radical containing from 1 to 7 carbon atoms, inclusive, with (B) crotononitrile, in the presence of a free radical promoting catalyst.

9. The process comprising heating a mixture of (A) a molar excess of a normal aliphatic saturated aldehyde containing from 2 to 8 carbon atoms, inclusive, with (B) crotononitrile, at a temperature from about 25 to about 100° C. in the presence of from about 0.1 to about 5 mole per cent, based on the total reactants, of a free radical promoting catalyst.

10. The process of claim 9 wherein the catalyst is a peroxygen catalyst.

TRACY M. PATRICK, Jr.

REFERENCES CITED

The following references are of record in the file of this patent:

UNITED STATES PATENTS

| Number | Name | Date |
|---|---|---|
| 2,386,735 | Borders et al. | Oct. 9, 1945 |